March 1, 1932.  A. KOPYCINSKI  1,847,517
WHEELED PLOW
Filed May 21, 1929  5 Sheets-Sheet 2
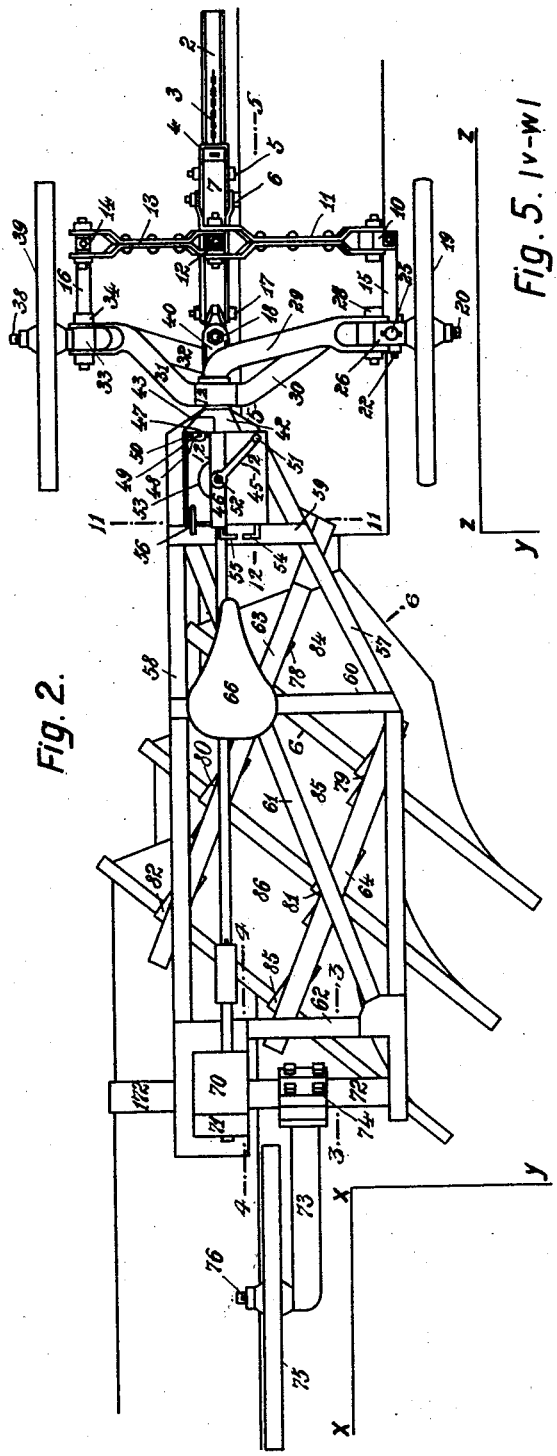
Inventor:
Aleksander Kopycinski

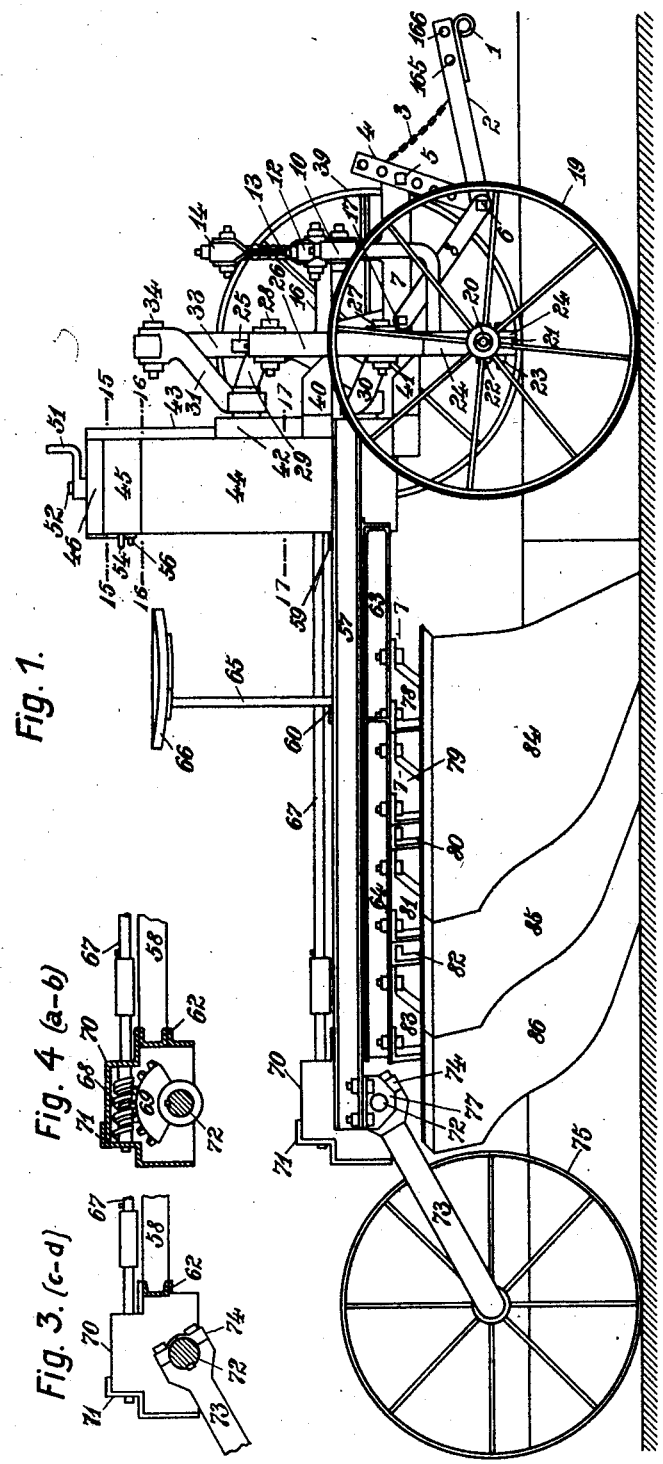

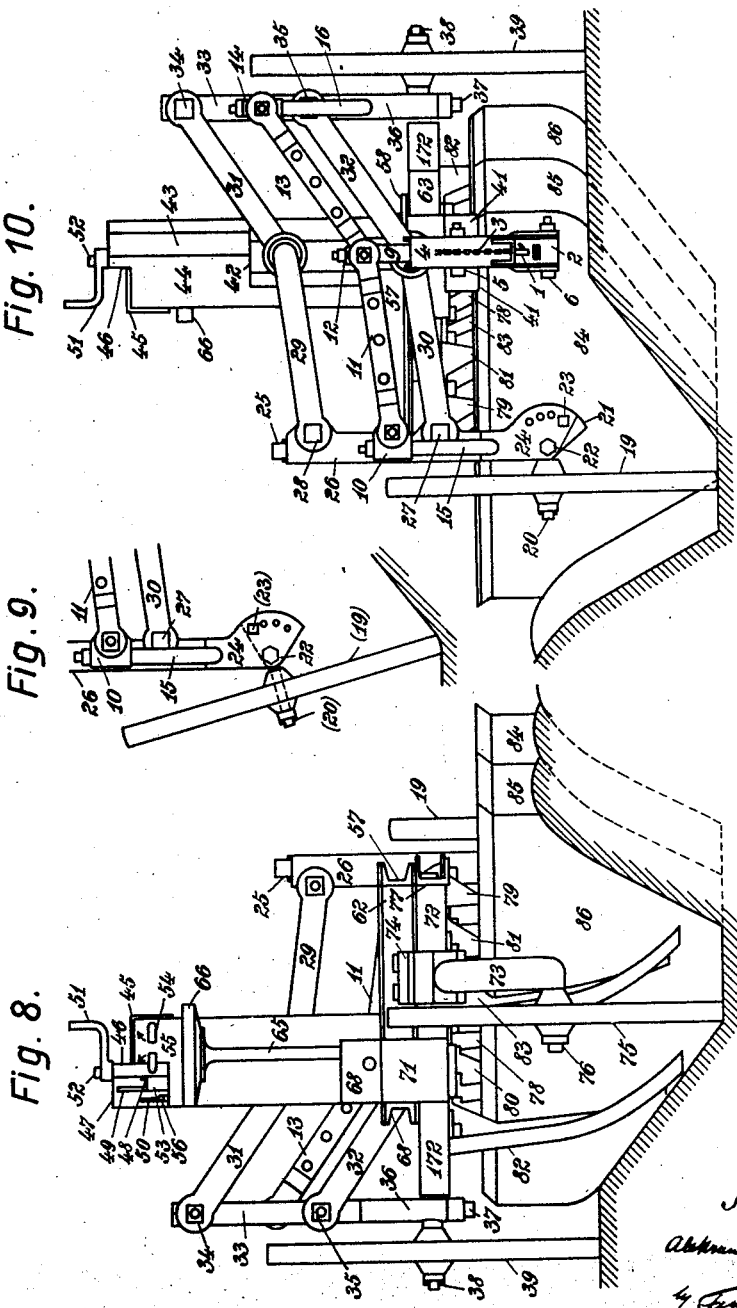

March 1, 1932.　　　A. KOPYCINSKI　　　1,847,517
WHEELED PLOW
Filed May 21, 1929　　　5 Sheets-Sheet 4
Fig. 11. (t-u)
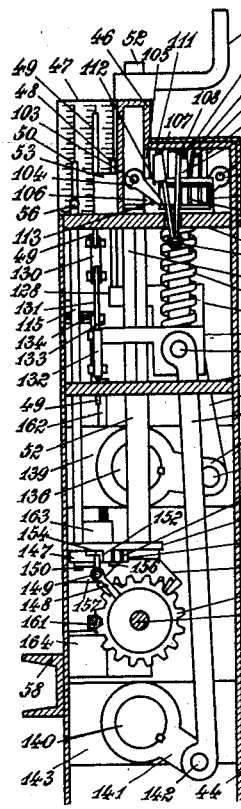
Fig. 12. (m-n, o-p)
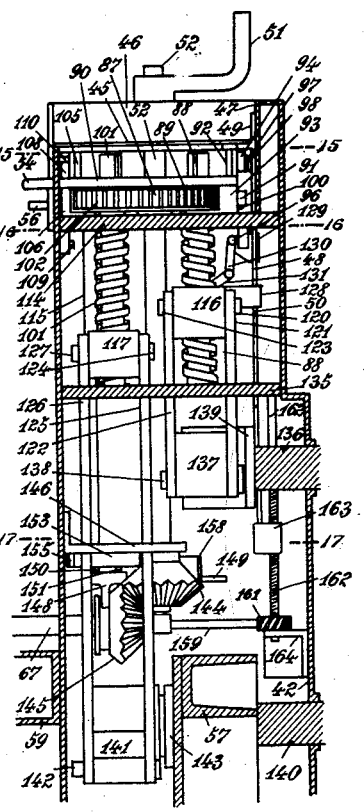
Fig. 16. (i-j)
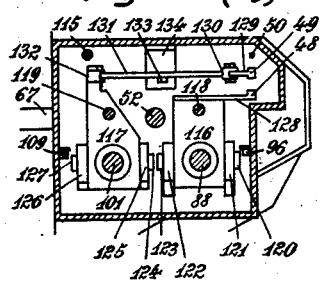
Fig. 17. (k-l)
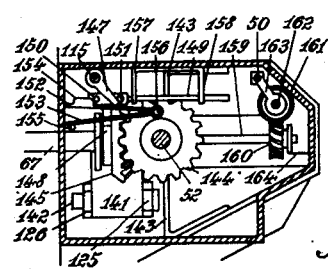
Inventor:
Aleksander Kopycinski

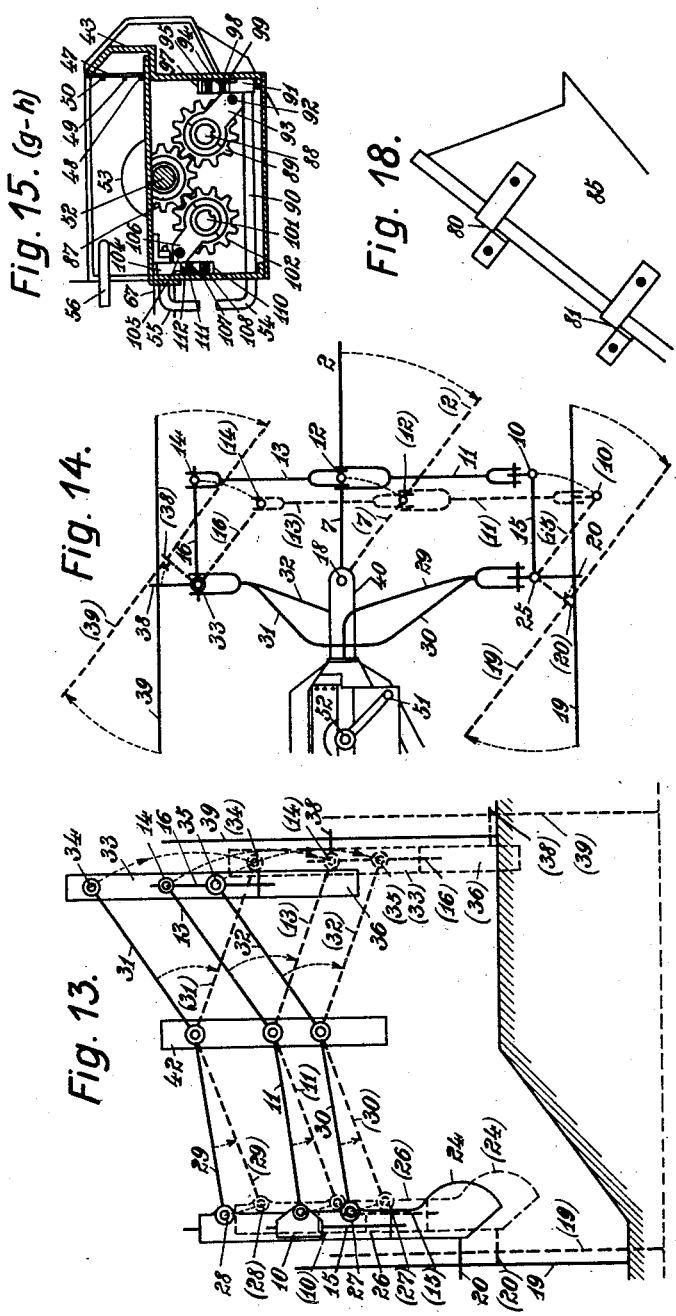

Patented Mar. 1, 1932

1,847,517

UNITED STATES PATENT OFFICE

ALEKSANDER KOPYCINSKI, OF KRAKAU, POLAND

WHEELED PLOW

Application filed May 21, 1929, Serial No. 364,888, and in Poland May 29, 1928.

This invention relates to an inclined cutting plow which differs from the known constructions of this type in that its shares cut the soil from the field side at a gentle inclined slope the angle of inclination of which is less than 45° whereas the slope of the furrow produced with known plows is considerably steeper, the angle of inclination being considerably larger than 45°.
The cutting of slices of earth with the above mentioned gentle slope presents the advantage that they are thin and wide and can be easily accommodated and loosely heaped on the slope of the plowed side which is steeper than on the field side. On the other hand the slices of earth cut towards the steeper slope from the field side, as is the case with the known plows of this type, are taken with the same horizontal distance of the cut surfaces, then with the gentle inclined slope and there is insufficient space for them to be accommodated and loosely heaped on the field side.

In order to produce a lateral support from the field side or to obtain a wider burrow sole for the draught animals, the share points may be provided with triangular teeth so that the furrow slope near the sole is vertical and the upper portion inclined.
Moreover a connection of the front running wheel axles with the carriage by means of a vertical articulated quadrangle guiding is arranged for the plow according to the invention for the purpose of height adjustment of the front wheel steered by the shaft, as also a rear wheel adjustable in the transverse direction to the travel for the purpose of enabling it to travel in the last furrow of the number of plow bodies is changed.
The axles of the running wheels are carried by arms provided with cranks which are rotated in known manner by screw threaded spindles.

A further feature of the invention consists in that instead of the lever usually employed for the height adjustment of the individual running wheels, a control shaft is provided with one or a plurality of driving toothed wheels, which can be coupled as desired with driving wheels of the height adjustment of the individual running wheels, so that, by means of a single crank on the shaft any desired single or number of running wheels can be adjusted in height by suitably setting control handles. In order to enable the driver of the plow to easily see the actual position of the running wheels and to thus enable a rapid and reliable adjustment of the wheels, indicator rods are according to the invention fitted on the screw spindles, the upper ends of these indicators being shiftable in known manner over scales and consequently indicating the actual position of the wheels.

An embodiment of the invention is illustrated by way of example in the accompanying drawings in which:—

Fig. 1 shows a side elevation of the plow,
Fig. 2 is a top plan view of Fig. 1,
Fig. 3 is a vertical section through the shaft on line 3—3 of Fig. 2,
Fig. 4 a vertical section through the segment element on line 4—4 of Fig. 2 and
Fig. 5 a vertical section through the draw pole on line 5—5 of Fig. 2, Fig. 6 is a vertical section through the share on line 6—6 of Fig. 2,
Fig. 7 is a horizontal section on line 7—7 of Fig. 1 showing a top plan view of the share, Fig. 8 shows a rear elevation of the plow,
Fig. 9 shows the right-hand inclined hand wheel,
Fig. 10 is a front elevation of the plow,
Fig. 11 is a vertical section through the driving gear on line 11—11 of Fig. 2 and
Fig. 12 a similar view on lines 12—12 of Fig. 2.
Fig. 13 is a diagrammatic elevation showing the inclined adjustment of the front running wheels when turning to the right,
Fig. 14 is a diagrammatic plan view showing the turning mechanism,
Fig. 15 is a horizontal section on a larger scale on line 15—15 of Figs. 1 and 12,
Fig. 16 a similar view on line 16—16 of Figs. 1 and 12,
Fig. 17 a similar view on line 17—17 of Figs. 1 and 12, and

Fig. 18 shows in top plan view the front portion of the centre share terminating in a triangular tooth.

According to the invention the plow comprises a carriage and plow bodies 84, 85 and 86, i. e. shares combined with mouldboards which are fastened to bars 63 and 64 by means of suspensions 78, 79, 80, 81, 82 and 83. These bars are in turn fixed to a carriage frame 57, 58, 62 which is reinforced by transverse stays 59 and 60 and a diagonal 61.

The shares 84, 86 differ in principle from the known types in that each of same have two cutting edges, one of which serves for horizontally cutting the earth layer in the bottom of the furrow and the other to cut off the same layer at an angle of inclination of less than 45°. By placing these shares close together, the thin slices of earth are cut off and turned over by means of mould boards provided on some of the shares.

The carriage frame rests on the axles of three running wheels, two front wheels 19 and 39 and a rear wheel 75. Each of the front running wheels 19 and 39 is connected to the carriage frame by means of a vertical articulated quadrangle, composed of two transverse girders 29, 30 and 31, 32 respectively (Fig. 10), connected at one end with columns 26 and 33 fixed on axles 20 and 38 of the wheels 19 and 39, and at the other end hingedly connected with the carriage frame by means of shafts 136 and 140 (Figs. 11 and 12), each of said shafts carrying a lever 137 and 141 respectively.

This articulated connection of the girders to the columns is effected by bolts 28, 27 or 34, 35 respectively loosely inserted in holes in the girders and columns. The object of this arrangement is, to permit of the vertical adjustment of the front running wheels 19 and 39. By turning one of the levers, e. g. the crank 137, through a certain angle, the girder 29 connected with the shaft 131 turns through the same angle and raises or lowers the columns 26 and also the axle 20 connected therewith and the right hand wheel 19. The object of the second girder 30, which sits loosely on the shaft 140, is to maintain the column 26 in vertical position during the movements above described. In a similar manner the left front wheel 39 may be displaced vertically, the rotation of the lower shaft 140 connected with the girder 32 by means of the crank 141 causing a raising or lowering of the column 33. At the same time the second girder loosely sitting on the shaft 136 maintains the column 33 in vertical position during the displacement. One end of each of the shafts 136 or 140 is inserted in a housing 42 and the other end in a bearing plate 139 and 143 (Fig. 11) respectively.

Various positions of the articulated quadrangle, serving for vertical adjusting of the front running wheels, are shown diagrammatically in Fig. 14.

The rear running wheel 75 is connected with the carriage frame by an arm 73, the end of which is joined to the axle 76 of the wheel whereas the other end is fixed to a shaft 72 by means of the rod head 74. The point of connection may be changed if desired, e. g. when altering the number of shares, so that the rear running wheel travels in the furrow cut by the last share or on the surface if the arm 73 is fixed on an extension 172 of the shaft 72 projecting beyond the frame. The fixing of the shaft 72 onto the carriage frame is effected on the one hand by a suspension 77 and on the other hand by a steel metal piece 70 forming a housing for a worm wheel segment.

The vertical adjustment of each running wheel is carried out by rotating a crank 51, which actuates a crank shaft 52, a spurwheel 87 and bevel wheel 144 (Figs. 15, 11, 12 and 17) mounted on the shaft 52; by engaging or disengaging spur wheels 89, 102 and 145 which are slidably mounted on shafts 88, 101 and 87 respectively, one, two or all three shafts 88, 101 and 67 will be rotated.

The rotated shaft 88 or 101 (Figs. 11, 12, 16 and 17) carrying on its screw threaded end a nut 116 or 117 having journals 120 and 123 or 124 and 127 at either side, and connected by the connecting elements 121 and 122 or 125 and 126 to the bolts 138 or 142 of the crank 137 or 141, causes, in its movement, a displacement of the nut 116 or 117 and of the connecting elements 121 and 122 or 125 and 126 as well as a rotation of the crank 137 or 141 keyed to the shaft 136 or 140, and raises or lowers the running wheels 19 or 39 through the intermediary of the vertical articulated quadrangle above described. In order to prevent the turning of the nut 116 or 117, a rod 118 or 119 passes freely through a hole in the nut 116 or 117. The shafts 88 and 101 are mounted with one end in the bearing plate 114 or 135 respectively and the crank shaft 52 with one end in the plate of the housing 46 and with the other end in the bearing plate 146 (Figs. 11 and 12).

Instead of the cranks 137 and 141, the rotation of the shafts 136 and 140 respectively in the case of the front wheels can also be effected by a worm drive.

The rotation of the shaft 67 connected with a worm 68 (Fig. 4) meshing with the worm-wheel segment 69 on shaft 72, causes the arm 73 keyed to the shaft 72 to turn and the raising or lowering of the rear wheel 75. In order to protect the worm and worm wheel segment, a housing is provided composed of parts 70 and 71.

Instead of the worm wheel segment 69 on the shaft 72 a crank may be provided which is rotated by a screw spindle as in the device described for the front wheels.

For raising one or any desired number of running wheels, control mechanisms are provided which engage or disengage the spur wheels 89, 102 and 145. In order to disengage the spur wheel 102 a key is provided with a handle 55 (Figs. 11, 15, 8, 1 and 2) which, on being turned upwards in the direction of the arrow (Fig. 8), first exerts pressure through a catch 104 keyed to a key shaft 103 onto a spring 107 (Fig. 11), and then pushes back the spring 107. The catch 104 then engages with a tooth 112 similarly mounted to the tooth 113 in the shank of the fork 106 carrying the spur wheels 102, and pushes upward the fork 106 with spur wheel 102. When the tooth 112 arrives over the pawl 111 connected to the spring 102, the spring, on being released from the pressure of the catch 104, returns into its initial position and holds the tooth 112 and therefore the spur wheel by means of the pawl 111, in which position the gear is disengaged. In a similar manner the spur wheel 102 may be engaged by turning the handle 55 in the opposite direction, when the catch of the key 104, after pushing back the spring 107, engages the tooth 113 and shifts it in downward direction together with the fork 106 and the spur wheel 102.

A journal 109 and a pin 110 on which an arm 108 of the spring 107 is hingedly mounted, serve for holding the spring 107. The sliding of the fork 106 in upward or downward direction is effected along a guide rod 105 loosely inserted in openings in the upper and lower arms of the fork 106. Similar to the control mechanisms for the spur wheel 102, the control mechanism for the spur wheel 89 has a handle 54 and that for the bevel wheel 145 a handle 54. However, the mechanism for the bevel wheel differs in that, instead of a fork, a clutch element is provided, the projection of which slides into a slot of the wheel 145 (Figs. 12 and 17), the shank of this element being fixed to a horizontal guide rod 149 loosely passing through holes in bearing plates 157 and 158.

The remaining parts of the control mechanism for wheel 89 or 145 are the same as the corresponding parts of the control mechanism for wheel 102, namely part 90 or 115 is similar to part 103; 91 or 147 to 104; 92 or 149 to 105; 93 or 148 to 106; 94 or 152 to 107; 95 or 153 to 108; 96 or 156 to 109; 97 or 155 to 110; 98 or 154 to 111; 99 or 150 to 112, 100 or 151 to part 113.

For the adjusting of the running wheels 19, 39 and 75 in vertical direction indicators are provided, i. e. adjustable rods 48, 49 and 50 (Figs. 11 and 15) the upper ends of which indicate, on scales marked on a plate 47, the actual position of the running wheels 19, 39 and 75 in relation to the plow bodies, whereby, on raising or lowering the running wheel, the corresponding indicator connected with the axle of the wheel in question, rises or sinks over said scale.

The position of the right hand running wheel 19 is indicated on a scale by the indicator 48, fixed at its lower end by means of a bar 128 to the nut 116 (Figs. 11, 12, 15, 16), the vertical displacement of which is transmitted to the indicator.

The indicator 49 shows the position of the left hand running wheel 39. This indicator is connected to the nut 117 by a two-armed lever 131 and links 132, 130, the link 132 connecting one end of the lever 131 with the nut 117, and the link 130 connecting the outer end of the lever 131 with the bar 129, this latter being fixed to the indicator rod 49. The connection between the links 132 and 130 and the lever and the nut or the bar, form a link system. The nut of the lever 131 is loosely fixed to the support 134 by a pin 133 (Fig. 16). In this arrangement the vertical movements of the indicator 47 are identical with the displacement of the wheel, but inversely to the movement of the nut 117 which descends when the wheel 39 is raised and ascends when this wheel is lowered.

The indicator 50, which indicates the position of the rear running wheel 75, is adjusted in such a manner that the turning motion of the shaft 67 is transmitted to the rod 162 (Figs. 12, 17) through the intermediary of a pair of helical wheels, the one wheel 160 of which (Fig. 17) is mounted on an extension 159 of the horizontal shaft 67, the other wheel 161 being keyed on a rod 162 screw-threaded at its upper end. The rotary movement of the screw threaded rod 162 imparts a vertical movement to a nut 163 mounted on the rod and to the indicator 50 which at the same time prevents the turning of the nut 163, in that it passes through holes in plates 114 and 135. The ends of the rod 162 rest in plates 135 and 164.

A housing serves to protect the above described elements, the individual parts of this housing being designated by the numerals 42, 43, 44, 56, 57 and 53 in Figs. 1 and 2 of the accompanying drawings.

A pole 2 (Figs. 1, 2 and 5) is provided for drawing the plow and steering the same on turning. This pole is connected to the carriage frame by means of a triangle composed of three bars 4, 7 and 8 (Fig. 5) bolted together. This triangle serves for vertical adjustment of the pole so as to alter the height of the point of engagement of the force on the bolt 6 by removing the bolt 5, lifting or lowering the bar 4 and replacing the bolt 5 in another bolt hole of the bar 4 connected therewith. The pole 2 (Fig. 1) is provided with a draught hook 1 having screw holes 165, 166 for fastening a pole, as also with a chain 3 by means of which the pole is held when not in use. The bar 7 (Figs. 5 and 2)

is connected with the carriage frame by means of a pin 18 which passes through a cylindrical hole in the bent projection of the bar 7 and through holes in the lugs on the carriage frame.

In order to permit screwing and turning, the bolt 9 (Figs. 1, 2, 5 and 10) on the bar 7 is connected by a transverse part 11 or 13 and a rod 15 or 16 to the projection 24 or 36 (Fig. 10) of the axle 20 or 36 of the right hand wheel 19 or of the left hand wheel 39 respectively in such a manner that the bar 7, the transverse part 11 and the rod 15 form a horizontal parallelogram which serves for steering the right hand wheel 19 and the bar 7, the transverse part 13 and the rod 16 forming a similar parallelogram for steering the left hand wheel 39. If the pole 2 and the bar 7 are turned through a certain angle, the rods 15 and 16, the axles 20 and 38 as also the front wheels 19 and 39 will be deflected the same angle so that these latter will assume a position parallel to the pole 2 and the new direction of travel.

In order to permit of vertical adjustment of the front wheels 19 and 39, the transverse parts 11 and 13 are connected with the rods 15 and 16 as also with the bolt 9 by means of double links 10, 14, and 12, which enable a tilting of the transverse parts 11 and 13 in vertical direction as also a pivoting of the bar 7 and the rods 15 and 16 in horizontal direction. The double link 10 or 14 or 12 forms a movable cylindrical hollow bearing sitting loosely on the cylindrical end of the bolt 9 or of the rods 15 or 16 and provided on both sides with projections engaging in openings in the forks on both ends of the transverse parts 11 and 13.

In order to permit pivoting of the axles 38 20 in a vertical plane, these axles are connected with columns 33 or 26 respectively (Fig 10) in such a manner that for the left hand wheel 39 the cylindrical extension 37 of the column 33 is loosely inserted in the cylindrical bore of the projection 36 connected with the axle 38, and that the roll shaped rod 25 on the right hand wheel 19 and fastened to the projection 24 of the axle is loosely inserted in a suitable bore of the column 26.

The right hand running wheel 19 (Figs. 10 and 9) may be secured in inclined position on the projection 24. For this purpose the flat portion 21 of its axle 20 is inserted between the plates of the projection 24, and secured thereto by bolts 22 and 23. On removing the bolt 23, the axle rotates through a certain angle and by reinserting the bolt in one of the other holes provided in the projection and in the flat extension 21 of the axle 20, the wheel 19 can be again fixed in a more or less inclined position on the projection.

The driver can effect the adjustment of the wheels with the aid of the crank 51 and the handles 54, 55 and 56 of the control keys, whereby he may either walk beside the plow or sit on the seat 66 mounted on the carriage frame by the upright 65.

I claim:

1. In an inclined cutting shallow surface plow, shares having each two cutting edges, one cutting edge adapted to cut horizontally into the sole of the furrow and the second of said edges to cut the soil from the field side at an inclination of less than 45°, said shares adapted to be arranged close together to cut up the thin inclined slices, and mould boards connected with said shares adapted to turn the cut up slices.

2. In a plow as specified in claim 1, share points in the shape of triangular teeth adapted to form the furrow slope, vertical at the bottom and inclined at the top.

3. A plow as specified in claim 1, comprising in combination a carriage, front wheels on said carriage, an axle for each of said wheels, a hinged parallelogram adapted to control said front wheels and an articulated quadrangle carrying said parallelogram, adapted to be adjusted in height.

4. A plow as specified in claim 1, comprising in combination with front wheels of the plow, a parallelogram guide adapted to adjust said front wheels in height, articulated quadrangles carrying each one of said front wheels adapted to allow said wheels to be adjusted independently the one of the other.

5. A plow as specified in claim 1, comprising in combination running wheels and the shaft of the plow, a parallelogram guide adapted to transmit the veering movement of said shaft to said wheel, an axle for each of said running wheels, a column on said axle, an extension on said axle, and a cylindrical rod rotatable in said column connected to said extension adapted to allow the turning of said axle in the horizontal direction during the veering of said wheel by said shaft through the intermediary of said parallelogram guide.

6. A plow as specified in claim 1, comprising in combination running wheels, an axle for each of said running wheels, a column on each of said axles, a cylindrical extension of said column, a cylindrical projection on each of said axles having a cylindrical bore adapted to be loosely fitted on said cylindrical extension.

7. A plow as specified in claim 1, comprising in combination front wheels of the plow, arms carrying said axles of said wheels, an adjusting device for said wheels, cranks on said adjusting device connected to said arms, nuts connected to said cranks and screw spindles engaging in said nuts adapted to turn said cranks.

8. A plow as specified in claim 1, comprising in combination with the front wheels, a plow carriage, an articulated rectangle connecting said wheels to said carriage, worm segments on said wheels, arms on said segments, shafts carried by said arms, spindles and worms on said spindles engaging said shafts.

9. A plow as specified in claim 1, comprising in combination an adjusting device, a shaft of said adjusting device, driving wheels on said shaft, running wheels of the plow, a height adjusting device adapted to engage as desired with said adjusting device wheels, a crank on said shaft adapted to adjust any of said running wheels as desired, and handles adapted to actuate said crank.

10. A plow as specified in claim 1, comprising in combination with the carriage, a rear wheel on said carriage, an axle carrying said wheel, a shaft, an arm connected with said axle slidably mounted on said shaft adapted to displace said rear wheel transversely to the direction of travel.

11. A plow as specified in claim 1, comprising in combination with the shares, a plow frame, running wheels on said frame, an adjusting device, screw spindles of said adjusting device, nuts on said screw spindles, indicators connected to said nuts, and scales coacting with said indicators adapted to indicate the position of each of said running wheels relative to said frame and said shares.

In testimony whereof I affix my signature.

ALEKSANDER KOPYCINSKI.